(12) United States Patent
Chikazawa

(10) Patent No.: US 7,061,678 B1
(45) Date of Patent: Jun. 13, 2006

(54) STEREOSCOPIC DISPLAY DEVICE WITH TWO BACK LIGHT SOURCES

(75) Inventor: Yoshiharu Chikazawa, Yokohama (JP)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/437,370

(22) Filed: Nov. 10, 1999

(51) Int. Cl.
*G02B 27/22* (2006.01)

(52) U.S. Cl. .................. 359/464; 359/462; 359/471; 359/475

(58) Field of Classification Search ............. 359/462, 359/463, 464, 466, 376, 377, 378, 455, 459, 359/627, 742; 353/7, 98, 99; 348/55, 51, 348/52
See application file for complete search history.

(56) References Cited

U.S. PATENT DOCUMENTS 5,311,220 A * 5/1994 Eichenlaub ............... 348/55
5,835,264 A * 11/1998 Tandler et al. ............. 359/377
6,014,164 A * 1/2000 Woodgate et al. .......... 348/51

FOREIGN PATENT DOCUMENTS

| EP | 0 650 301 A | 4/1995 |
|---|---|---|
| EP | 0 656 556 A | 6/1995 |
| EP | 0 656 730 A | 6/1995 |
| EP | 0 804 042 A | 10/1997 |

* cited by examiner

*Primary Examiner*—Audrey Chang
(74) *Attorney, Agent, or Firm*—Joseph S. Tripoli; Robert B. Levy; Joseph J. Kolodka

(57) ABSTRACT

The present invention is a stereoscopic display device including a transmissive image reproducing element, two light sources, an optical apparatus to direct the light emitted by one light source towards the right eye and to direct the light emitted by the other light source towards the left eye, and control means for displaying alternately an image for the right eye and an image for the left eye on the image reproducing element, and for activating the source emitting light for the right eye only when the image for the right eye is displayed and for activating the source emitting light for the left eye only when the displayed image is for the left eye. The optical apparatus is a mirror apparatus providing either a converging beam or a parallel beam.

16 Claims, 2 Drawing Sheets

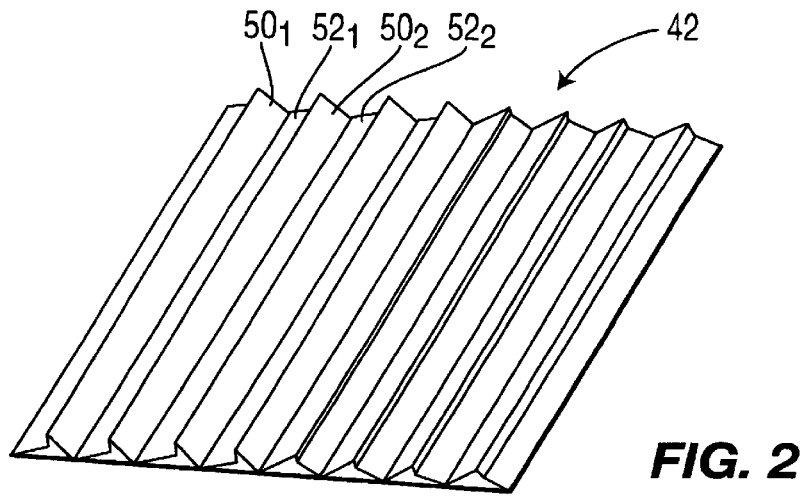
FIG. 2
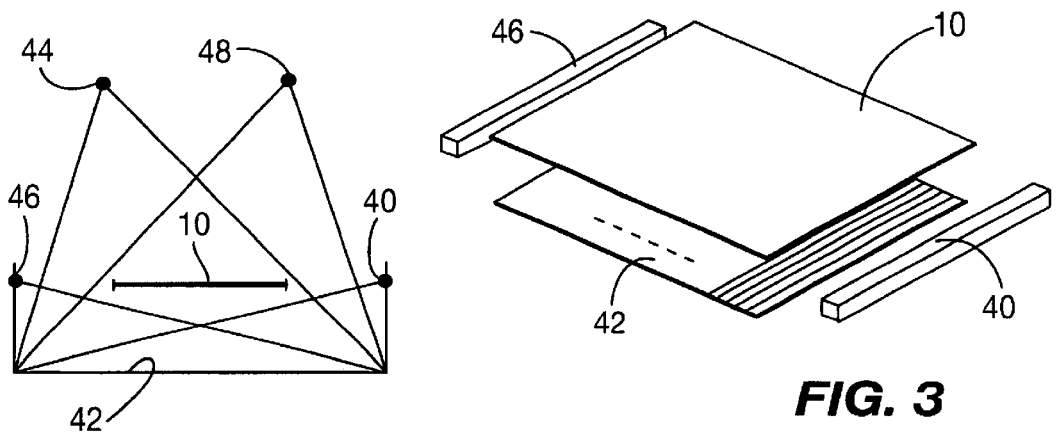
FIG. 1
FIG. 3
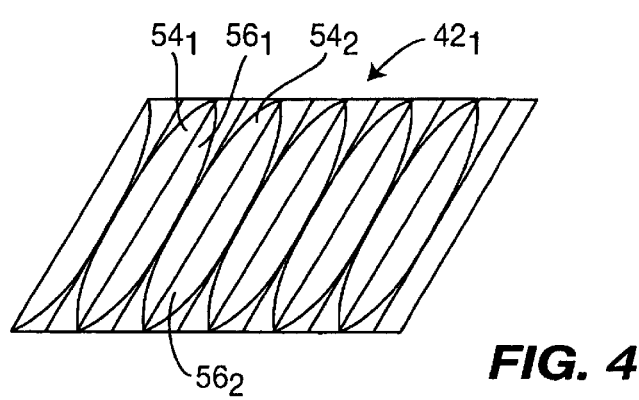
FIG. 4

STEREOSCOPIC DISPLAY DEVICE WITH TWO BACK LIGHT SOURCES

BACKGROUND OF THE INVENTION

The invention relates to a stereoscopic display device comprising a transmissive image reproducing element with two light sources on the rear side of this element.

DESCRIPTION OF PRIOR ART

For reproducing stereoscopic TV images, it is known to provide, on a display, alternately, an image for the left eye and an image for the right eye and to provide optical means directing the left image to the left eye and the right image to the right eye.

It has been more particularly proposed a LCD type display device wherein the picture elements (pixels) of the transmissive LCD are alternately activated in order to reproduce the image for the left eye and the image for the right eye. In this known device, two light sources and a lens are provided on the rear side of the (LCD) image reproducing element. These sources are located in the focal plane of the lens. The position of one source is such that the parallel beam that it produces on the front side of the LCD is directed towards the right eye and the other source is located in a position for which the parallel beam that it produces is directed towards the left eye. These sources are activated in synchronism with the corresponding images. In other words, the source which provides light directed towards the right eye is lit when the right image is activated on the LCD.

SUMMARY OF THE INVENTION

The invention is based on the recognition that the volume of the known device is hardly compatible with portable applications such as for lap top computers or individual movie displays.

In order to overcome this drawback, the invention provides mirror means to direct the light emitted by one light source towards the right eye and to direct the light emitted by the other source towards the left eye, the light sources and the image reproducing element being installed on the same side of the mirror means.

As, in the known device, the light sources and the image reproducing element are on opposite sides of a lens, the volume of the device according to the invention may be smaller than the volume of the known device.

The mirror means may provide parallel beams or converging beams.

BRIEF DESCRIPTION OF THE DRAWINGS

Other features and advantages of the invention will appear with the following description of some of its embodiments, this description being made in connection with the drawings in which:

FIG. 1 represents schematically a stereoscopic display according to an embodiment of the invention, FIG. 2 represents a Fresnel mirror for the device of FIG. 1, FIG. 3 is another representation of the device of FIG. 1, FIG. 4 shows another type of Fresnel mirror for the device of FIG. 1 or FIG. 3.

DESCRIPTION OF PREFERRED EMBODIMENTS

Figure 5:
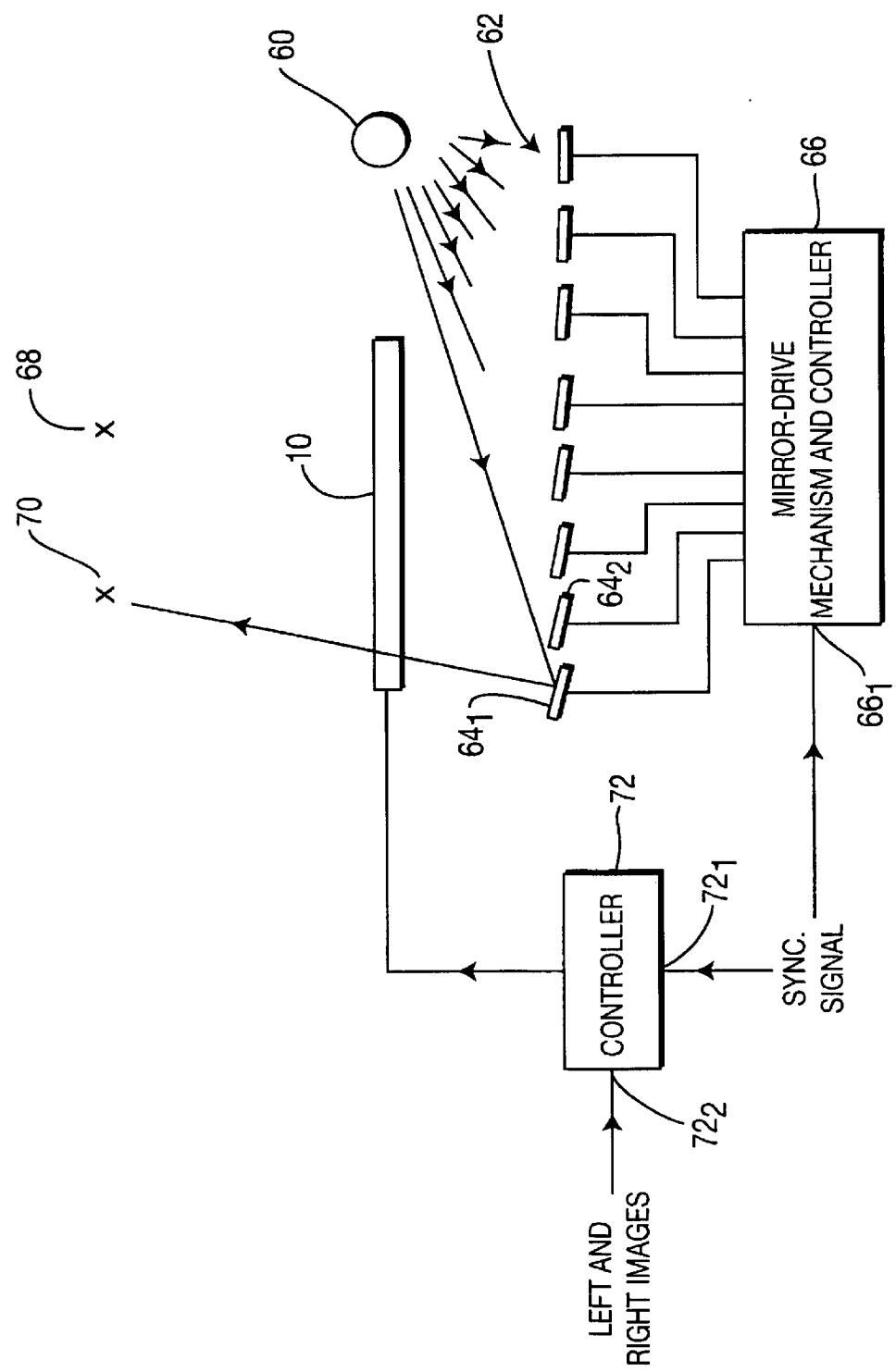
FIG. 5 shows an embodiment of the invention.

In the embodiments represented on the drawings, the stereoscopic display device comprises a liquid crystal display 10 comprising a multiplicity of pixels for which the transmissivity and the color is controlled in order to form the image. In order to display stereoscopic moving images, the period of one image (one frame) is divided into two fields wherein the first (or second) field produces the image for the right eye and the second (or first) field produces the image for the left eye.

Two light sources 40 and 46 (FIG. 1 and FIG. 3) are lit alternately in synchronism with the reproduction of the images for the right eye and the images for the left eye. The light source 40 is energized when the image for the right eye 44 is reproduced on LCD 10 and the light source 46 is energized when the LCD 10 reproduces the image for the left eye 48. In the embodiment shown, the mirror 42 (FIG. 1) or $42_1$, (FIG. 4) is converging and of the Fresnel type. This mirror makes an image of the right source 40 on the right eye 44 and an image of the left source 46 on the left eye 48.

During the first field, only the light source 40 is active and LCD 10 displays only the image for the right eye.

During the second field, only light source 46 is active and LCD 10 displays only the left image.

As shown on FIG. 1, the light source 40 is active when the LCD 10 displays the right image and the converging mirror 42 makes the image of this source 40 on the right eye 44. Similarly, the light source 46 is active only when LCD 10 displays the left image and the mirror 42 makes the image of this source 46 on the left eye 48.

The position of LCD 10 with respect to sources 40, 46 and with respect to the mirror 42 must be such that the light from sources 40 and 46 must cross this LCD 10 only after having been reflected by mirror 42.

The advantage of this embodiment is that it may be compact, because the light sources 40 and 46 are on the same side of mirror 42 as LCD 10. On the contrary, in the known device, the light sources, on one hand, and the LCD 10, on the other hand, are on opposite sides of a lens.

In the embodiments represented on the figures, the light sources 40 and 46 (FIG. 3) are elongated along one side of element 10 of rectangular shape.

The Fresnel mirror 42 represented on FIG. 2 has alternate elongated stripes $50_1$, $52_1$, $50_2$, $52_2$, etc. The direction of elongation is the direction of elongated light sources 40 and 46. The elongated stripes $50_1$, $50_2$, $50_3$ ... $50_i$ ... form a first converging mirror and the second elongated stripes $52_1$, $52_2$ ... $52_i$ ... form a second converging mirror. The first converging mirror is the one which makes the image of source 40 on the right eye 44 (FIG. 1) and the second mirror, with elongated elements $52_i$, makes the image of light source 46 on the left eye 48.

In this example, the two Fresnel mirrors (stripes $50_i$ and $52_i$) are of the cylindrical type.

In order to distribute the light energy of each source 40 and 46 on LCD 10, it is possible to use a diffuser and/or an optical integrator (not shown).

In the embodiment shown on FIG. 4, the Fresnel mirror $42_1$ has also two types of alternated elongated stripes $54_1$, $56_1$, $54_2$, $56_2$, etc. which form converging mirrors for the right and the left eyes. But the shapes of these mirrors are such that they can be used in conjunction with light sources of the punctual type. For instance, the two mirrors define an ellipsoïdo-paraboloïd of revolution.

The light sources may be of any type, for instance light emitting diodes (LED). One or several diodes may be used to form a punctual light source and these light diodes may be also disposed along a line in order to form elongated light sources.

The transmissive image reproducing element 10 may be of any type, either black and white or colored.

In another embodiment, the light sources 40 and 46 are at focal point(s) or plane(s) of a mirror and provide parallel beams respectively to right eye 44 and to left eye 48.

In the embodiment represented on FIG. 5, only one light source 60 is provided and the mirror means 62 comprises an array of mirror elements $64_1$, $64_2$, etc. the orientation of which is controlled by motor means and a control circuit, both being represented by a block 66. The goal of the block 66 is to focus the light beam generated by a source 60 and reflected by each mirror element, alternately on the right eye 68 and on the left eye 70.

Like in the embodiment represented on FIG. 1, the LCD 10 is controlled in order to display alternately the images for the right eye and for the left eye. This control of the display 10 is realized with a synchronization signal provided at an input $72_1$ of a control circuit 72 for the LCD 10. Said control circuit 72 has also an input $72_2$ receiving the signals for the left and the right images.

The same synchronization signal which is provided to the input $72_1$, of control circuit 72 for the LCD 10 is also provided to an input $66_1$, of the block 66 for controlling the tilt of mirror elements $64_1$, $64_2$, etc.

Compared to the embodiment of FIG. 1, only one light source 60 is provided instead of two. Therefore, the device is less bulky; this feature is particularly advantageous for a portable device.

The mirror elements $64_1$, $64_2$, etc. may be either elongated elements (stripes), preferably in one direction, as those represented with FIG. 2 and FIG. 4, or small elements disposed in a matrix-like manner. In the latter case, a plurality of elements are provided on each column and on each line.

The control of the orientation or tilt of the mirrors may be realized conventionally like in a digital mirror device (DMD).

The light source 60 may have the shape of a point or an elongated shape, like lamp 40 represented on FIG. 3.

It may be necessary to use optical means (not shown) for a correct focusing at points 68 and 70, these optical means being installed between the light source 60 and the mirror means 62 and/or between the mirror means 62 and the focus points 68 and 70.

What is claimed is:

1. A compact stereoscopic display device comprising:
   a transmissive image reproducing element,
   light source means including a first light source and a second light source,
   optical means to direct though the transmissive reproducing image reproducing element the light emitted by said first light source towards the right eye and to direct the light emitted by said second light source towards the left eye, and
   control means for displaying alternately an image for the right eye and an image for the left eye on the transmissive image reproducing element, and for activating in synchronism with said transmissive image reproducing element the first light source when the image for the right eye is displayed and the second light source only when the image for the left eye is displayed,
   said optical means being formed of mirror means and the first and second light sources and the transmissive image reproducing element being on the same side of the minor means as the viewer so that the light from said first and second light sources firstly directed to said minor means and from said mirror means to said transmissive image reproducing element and then to the viewer.

2. A stereoscopic display device according to claim 1, wherein the mirror means are of the converging type.

3. A stereoscopic display device according to claim 2, wherein the mirror means are of the Fresnel type.

4. A stereoscopic display device according to claim 1, wherein the light sources are positioned at the focal plane of the respective mirror means to provide parallel beams.

5. A stereoscopic display device according to claim 1, wherein the mirror means are of the Fresnel type.

6. A stereoscopic display device according to claim 5, characterized in that the Fresnel mirror means comprise first mirror elements for directing the light of the corresponding source to the right eye and second mirror elements for directing the light of the other source towards the left eye.

7. A stereoscopic display device according to claim 6, characterized in that the first and second mirror elements form an alternate succession.

8. A stereoscopic display device according to claim 6, characterized in that the mirror elements form stripes elongated in one direction.

9. A stereoscopic display device according to claim 1, characterized in that the mirror means form cylindrical mirror means or ellipsoidal-paraboloidal mirror means.

10. A stereoscopic display device according to claim 1, characterized in that the light sources are elongated in the same direction.

11. A stereoscopic display device according to claim 1, characterized in that the image reproducing element has a rectangular shape and in that the light sources are elongated along one side of this image reproducing element.

12. A stereoscopic display device according to claim 1, characterized in that the image reproducing element comprises a liquid crystal display element.

13. A stereoscopic display device according to claim 1, characterized in that the image for the right eye is formed during a field of a frame and the image for the left eye is formed during the other field of the frame.

14. A stereoscopic display device comprising:
   a transmissive image reproducing element,
   a light source means,
   optical means to direct alternately the light emitted by light source means towards the right eye and towards the left eye, and
   control means for displaying in synchronism with the direction of the light, alternately an image for the right eye and an image for the left eye on the image reproducing element,
   said light source means comprises one single light source and in that the optical means comprising one single light source and wherein the optical means comprises movable mirror elements associated with mirror control means able to control the orientation of said movable mirror elements in such a way that each said movable mirror element has a first position and a second position, the first position directing the light towards the right eye when the image for the right eye is displayed on the transmissive image reproducing element, and the second position directing the light from the light source towards the left eye when the displayed image is for the left eye, the light source and the image reproducing element being installed on the same side of the movable mirror elements so that the light from the light source is directed to said movable mirror elements and from said movable mirror elements to said image reproducing element.

15. A stereoscopic display according to claim 14, characterized in that the mirror elements form stripes elongated in one direction.

16. A stereoscopic display according to claim 14, characterized in that the mirror elements are of the punctual type, these mirror elements forming a matrix arrangement, a plurality of such elements being provided on each line of the matrix and a plurality of mirror elements being provided on each column of the matrix.

* * * * *